United States Patent [19]
Brudy

[11] 3,784,149
[45] Jan. 8, 1974

[54] RETRACTABLE TRUCK MIRROR
[75] Inventor: Peter E. Brudy, Willowdale, Ontario, Canada
[73] Assignee: Dominion Auto Accessories Limited, Ontario, Canada
[22] Filed: Jan. 3, 1972
[21] Appl. No.: 214,594

[52] U.S. Cl. ............................... 248/478, 287/14
[51] Int. Cl. .............................................. B60r 1/06
[58] Field of Search .................. 248/282, 285, 289, 248/475 B, 477, 478, 479; 287/14

[56] References Cited
UNITED STATES PATENTS
3,583,734  6/1971  Magi ............................ 248/478 X
3,119,591  1/1964  Malecki ........................... 248/282
3,346,229  10/1967  Carson ............................. 248/477
3,360,296  12/1967  Hatch ............................ 248/289 X Primary Examiner—William H. Schultz
Attorney—Arthur Raisch et al.

[57] ABSTRACT

A truck mirror comprising a U-shaped support on which a mirror is pivotally mounted. The ends of arms of the support are pivoted to vertically spaced brackets that are adapted to be mounted on the truck. Pivot means are provided between the ends of the support arms and the brackets and comprise two members of low friction material. One of the members has axially extending circumferentially spaced grooves therein and the other of the members has complementary projections. The members are yieldingly urged toward one another such that the mirror is held in angularly adjusted position but may be readily moved to a new angular position by manual manipulation.

18 Claims, 5 Drawing Figures

RETRACTABLE TRUCK MIRROR

This invention relates to truck mirrors and particularly to adjustable truck mirrors.

BACKGROUND OF THE INVENTION

In truck mirrors, which are required by law in many governmental jurisdictions, it is common and desirable to provide for initial adjustment of the mirror to accommodate the driver and at the same time to provide a construction wherein the mirror can be readily retracted or moved out of its projected position for clearance and thereafter readily moved back to its adjusted position without the use of tools. Various designs have been heretofore proposed which require complicated constructions. Another problem with respect to the such constructions has been that of corrosion after prolonged use.

Among the objects of the present invention are to provide a novel truck mirror construction wherein the angular position of the mirror can be readily adjusted, changed for clearance and returned to its original position without the use of tools and wherein corrosion is minimized.

SUMMARY OF THE INVENTION

A truck mirror comprising a U-shaped support on which a mirror is pivotally mounted. The ends of the arms of the support are pivoted to vertically spaced brackets that are adapted to be mounted on the truck. Pivot means are provided between the ends of the support arms and the brackets and comprise two members of low friction material. One of the members has axially extending circumferentially spaced grooves therein and the other of the members has complementary projections. The members are yieldingly urged toward one another such that the mirror is held in angularly adjusted position but may be readily moved to a new angular position by manual manipulation.

DESCRIPTION

Figure 1:
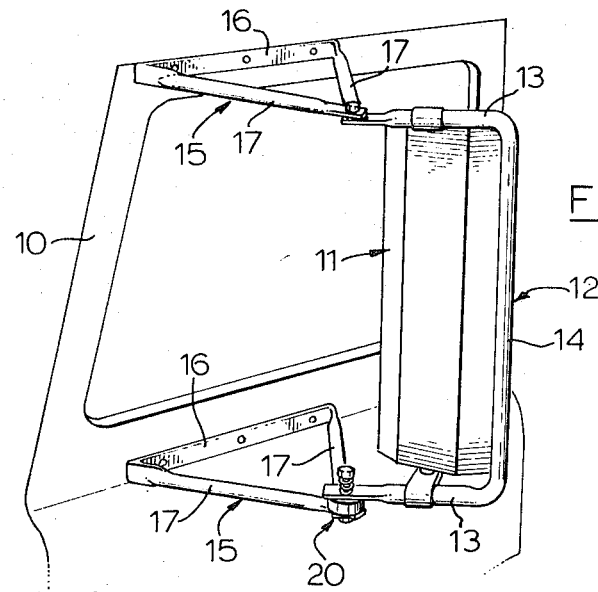
FIG. 1 is a fragmentary perspective view of a truck mirror construction embodying the invention.
Figure 2:
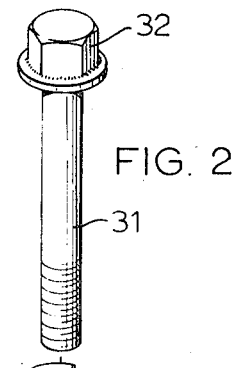
FIG. 2 is a fragmentary exploded view of a portion of the mirror.

Referring to FIG. 1, the mirror construction embodying the invention is adapted to be mounted on a door or other portion of a truck or similar vehicle and comprises an elongated mirror housing 11 which is pivotally supported at its ends on a U-shaped support 12 comprising spaced arms 13 connected by vertical portion 14. Brackets 15 are fixed at vertically spaced points on the door 10. Each bracket comprises a base 16 and angularly related legs 17 that have flattened ends 18 that overlap one another. The ends of the arms 13 are flattened as at 19.

Pivot means 20 are provided between the bracket arms 17, 18 and the support arms 13 at each bracket or at only one bracket.

Figure 4:
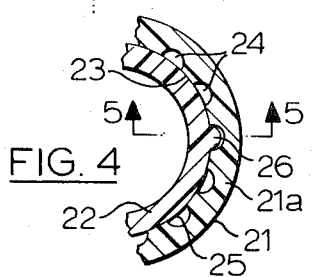
FIG. 4 is a fragmentary transverse sectional view.
Figure 5:
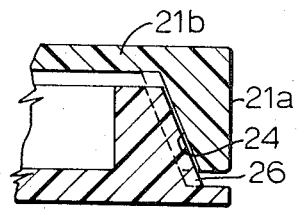
FIG. 5 is a fragmentary sectional view taken along the line 5—5 in FIG. 4.
Figure 3:
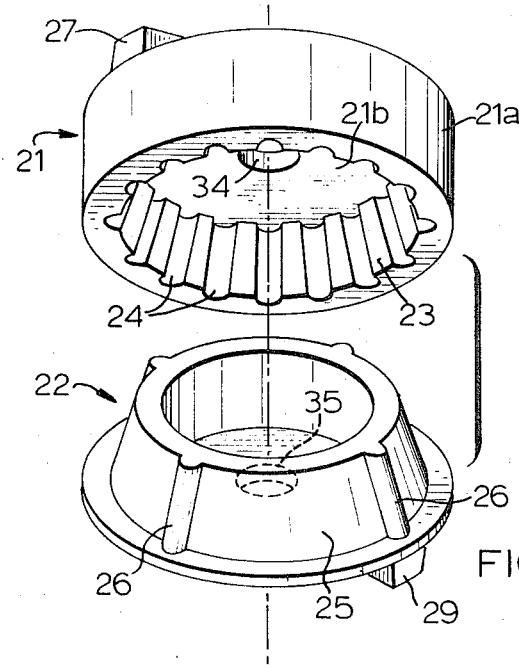
FIG. 3 is a fragmentary exploded view of a further portion of the mirror.

Each pivot means 20 comprises pivot members 21, 22. Pivot member 21 includes a generally cylindrical wall 21a and a base 21b. The inner surface 23 of cylindrical wall 21a is frusto-conical and has circumferentially spaced axially extending grooves 24 therein, the axes of which are inclined to the axis of the member 21. Pivot member 22 is generally frusto-conical and has an inclined outer peripheral surface 25 which is frusto-conical and generally complementary to surface 23 and is formed with circumferentially spaced projections 26 that are complementary to the grooves 24 and have axes inclined with respect to the axis of the member 22. The configuration of the grooves 24 and projections 26 is generally U-shaped but is such that when the grooves and projections are in engagement as presently described, the apex of each projection 26 is spaced from the base of each groove 24 (FIGS. 4 and 5). Pivot member 21 is formed with axially extending projections 27 which extend into opening 28 in the flattened portion 19 of arm 13. Similarly, pivot member 22 is formed with projections 29 that extend into recesses 30 of the flattened portion 18 of the leg 17. A bolt 31 having a head 32 extends through openings 33, 34, 35, 36 and a nut 37 is threaded on the end of the bolt 31. A washer 38 is interposed between leg 17 and nut 37. A compression spring 39 is interposed between the head 32 and the flattened portion 19 of arm 13 thereby providing a compressive force such that the pivot members 21, 22 are urged axially toward one another.

When assembled, the manual manipulation of the support 12 causes the pivot member 21 to be rotated angularly with respect to the support member 22. During this movement, axial compression of the spring 39 is achieved so that grooves 24 move successively into engagement with projections 26. When it is desired to re-adjust the mirror for clearance or for use by drivers of different physical proportions, the support 12 is again grasped to move the mirror to the desired position. In any position, the mirror is firmly held in its adjusted position.

The pivot members 21, 22 are preferably made of a low friction material such as organic plastic. A satisfactory material comprises nylon.

I claim:

1. In a mirror support, the combination comprising
   a mirror,
   a support on which said mirror is mounted,
   a bracket,
   pivot means for mounting said support on said bracket,
   said pivot means comprising a first pivot member of low friction plastic material fixed against rotational movement on said support,
   a second pivot member of low friction plastic material fixed against rotational movement on said bracket,
   one of said pivot members having a plurality of circumferentially spaced generally axially extending grooves therein,
   the other of said pivot members having a plurality of circumferentially spaced axially extending generally complementary projections thereon,
   each of said grooves and said projections having an axis inclined to the axis of the respective members,
   and means yieldingly urging one of said pivot members toward the other whereby said support and, in turn, said mirror is held in angularly related fashion with respect to said bracket but may be yieldingly moved to a new angularly related position by grasping said support and moving it angularly with respect to said bracket to cause said projections to move axially and circumferentially into engagement with others of said grooves, said one pivot member having axially extending circumferentially spaced grooves therein being generally annular and having an axially extending recess, the wall of which is formed with said grooves, the other said pivot member being generally frusto-conical and having said projections thereon.

2. The combination set forth in claim 1 wherein each said groove has a generally U-shaped configuration, each said projection having a generally complementary configuration.

3. The combination set forth in claim 2 wherein the configurations of each said projection and groove are such that when each said projection is in engagement with a groove the apex of each said projection is spaced from the base of the groove.

4. The combination set forth in claim 1 wherein said means yieldingly urging said pivot members toward one another comprises an axially extending member extending through said members, said axially extending member having enlarged means on the ends thereof, and a spring interposed between one of said enlarged means and a respective member to yieldingly urge said member toward the other said member.

5. The combination set forth in claim 4 wherein said axially extending member comprises a bolt, said enlarged means comprising a head on said bolt and a nut threaded on said bolt.

6. The combination set forth in claim 1 wherein each said pivot member includes locating projections thereon, said support and said bracket having complementary recesses into which said locating projections extend to circumferentially locate said pivot members with respect thereto.

7. The combination set forth in claim 1 where each said support and bracket has a flattened portion against which the respective pivot member is positioned.

8. In a mirror support, the combination comprising a mirror, a support comprising spaced support arms connected by an intermediate portion, said mirror being mounted on said support arms, brackets comprising spaced legs, pivot means pivoting said support arms on said legs, at least one of said pivot means comprising a first pivot member of low friction plastic material fixed against rotational movement on said support arm, a second pivot member of low frictional plastic material fixed against rotational movement on said bracket, one of said pivot members having an annular wall with an inner surface formed with a plurality of circumferentially spaced generally axially extending grooves therein, the other of said pivot members being generally frusto-conical and having a plurality of circumferentially spaced axially extending generally complementary projections on the periphery thereof thereon, each of said grooves and said projections having an axis inclined to the axis of the respective members, and means yieldingly urging said members toward one another whereby said support arm, and in turn, said mirror is held in angularly related fashion with respect to said bracket but may be yieldingly moved to a new angularly related position by grasping said support and moving it angularly with respect to said bracket to cause said projections to move axially and circumferentially into engagement with others of said grooves.

9. The combination set forth in claim 8 wherein each said groove has a generally U-shaped configuration, each said projection having a generally complementary configuration.

10. The combination set forth in claim 9 wherein the configurations of each said projection and groove are such that when the projections are in engagement with the grooves the apex of each said projection is spaced from the base of the groove.

11. The combination set forth in claim 8 wherein said means yieldingly urging said pivot members toward one another comprises an axially extending member extending through said members, said member having enlarged means on the ends thereof, and a spring interposed between one of said enlarged means and a respective member to yieldingly urge said member toward the other said member.

12. The combination set forth in claim 8 wherein said axially extending member comprises a bolt, said enlarged means comprising a head on said bolt and a nut threaded on said bolt.

13. The combination set forth in claim 8 wherein each said member has a base wall with locating projections thereon, said support arm and said leg of said bracket having a flattened portion having complementary recesses into which said locating projections extend to circumferentially locate said members with respect thereto.

14. The combination comprising pivot means comprising a first pivot member of low friction plastic material, a second pivot member of low friction plastic material, one of said pivot members having a plurality of circumferentially spaced generally axially extending grooves therein, the other of said pivot members having a plurality of circumferentially spaced axially extending generally complementary projections thereon, each of said grooves and said projections having an axis inclined to the axis of the respective members, and means yieldingly urging one of said pivot members toward the other whereby pivot members are held in angularly related fashion to one another but may be yieldingly moved to a new angularly related position by moving one angularly with respect to the other to cause said projections to move axially and circumferentially into engagement with others of said grooves, said one pivot member having axially extending circumferentially extending grooves therein having a generally annular wall with a frusto-conical inner surface in which said grooves are formed, the other said pivot member being generally frusto-conical and having said projections on the periphery thereof.

15. The combination set forth in claim 14 wherein each said groove has a generally U-shaped configuration,
each said projection having a generally complementary configuration.

16. The combination set forth in claim 14 wherein the configurations of each said projection and groove are such that when said projections are in engagement with said grooves the apex of each said projection when in engagement with its respective groove is spaced from the base of the groove.

17. The combination set forth in claim 14 wherein said means yieldingly urging said pivot members toward one another comprises an axially extending member extending through said members,
said member having enlarged means on the ends thereof,
and a spring interposed between one of said means and a respective pivot member to yieldingly urge said member toward the other said member.

18. The combination set forth in claim 17 wherein said axial member comprises a bolt,
said enlarged means comprising a head on said bolt and nut threaded on said bolt.

* * * * *